United States Patent
Kim et al.

(10) Patent No.: US 11,349,802 B2
(45) Date of Patent: May 31, 2022

(54) DEVICE AND METHOD FOR SETTING TRANSMISSION RULES OF DATA PACKET IN SOFTWARE DEFINED NETWORK

(71) Applicant: Samsung Electronics Co., Ltd., Suwon-si (KR)

(72) Inventors: Jae-Gon Kim, Yongin-si (KR); Kibeom Park, Hwaseong-si (KR); Eunjin Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 203 days.

(21) Appl. No.: 16/603,016

(22) PCT Filed: Apr. 4, 2018

(86) PCT No.: PCT/KR2018/003981
§ 371 (c)(1),
(2) Date: Oct. 4, 2019

(87) PCT Pub. No.: WO2018/186681
PCT Pub. Date: Oct. 11, 2018

(65) Prior Publication Data
US 2020/0036676 A1    Jan. 30, 2020

(30) Foreign Application Priority Data
Apr. 4, 2017 (KR) .................. 10-2017-0043696

(51) Int. Cl.
*H04L 61/103* (2022.01)
*H04L 45/00* (2022.01)
(Continued)

(52) U.S. Cl.
CPC ............ *H04L 61/103* (2013.01); *H04L 45/38* (2013.01); *H04L 45/64* (2013.01);
(Continued)

(58) Field of Classification Search
CPC .............. H04L 61/2007; H04L 61/103; H04L 61/6022; H04L 61/6059; H04L 45/38; H04L 45/64
See application file for complete search history.

(56) References Cited

U.S. PATENT DOCUMENTS 9,350,607 B2 *  5/2016  Agarwal ............. H04L 41/0806
9,450,823 B2 *  9/2016  Arora ...................... H04L 41/12
(Continued)

FOREIGN PATENT DOCUMENTS

| KR | 10-1574167 B1 | 12/2015 |
| KR | 10-2016-0095554 A | 8/2016 |
| KR | 10-2016-0116622 A | 10/2016 |

OTHER PUBLICATIONS

ISA/KR, International Search Report and Written Opinion of the International Searching Authority, International Application No. PCT/KR2018/003981, dated Jul. 13, 2018, 12 pages.
(Continued)

*Primary Examiner* — Hassan A Phillips
*Assistant Examiner* — Prenell P Jones

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). Methods of operating a device for controlling a flow rule in a software-defined network (SDN), according to various embodiments, comprise: an operation of receiving a physical address request packet for a first host to communicate with a second host from a first network device connected with the first host; an operation of transmitting the received physical address request packet to a second network device connected with the second host; an operation of generating a flow rule relating to a transmission path of a data packet transmitted from the first host to the second host, on the basis
(Continued)

of the physical address of the first host and the physical address of the second host, when a physical address response packet including the physical address of the second host is received from the second network device as a response to the physical address request packet; and an operation of transmitting the generated flow rule to the first network device and the second network device, so that the first network device and the second network device transmit the data packet on the basis of the flow rule.

16 Claims, 13 Drawing Sheets

(51) Int. Cl.
*H04L 45/64* (2022.01)
*H04L 61/5007* (2022.01)
*H04L 101/622* (2022.01)
*H04L 101/659* (2022.01)

(52) U.S. Cl.
CPC ...... *H04L 61/2007* (2013.01); *H04L 61/6022* (2013.01); *H04L 61/6059* (2013.01)

(56) References Cited

U.S. PATENT DOCUMENTS

| | | | | |
|---|---|---|---|---|
| 9,960,956 | B1* | 5/2018 | Johnson | H04L 41/142 |
| 2004/0221042 | A1* | 11/2004 | Meier | H04L 12/4625 |
| | | | | 709/227 |
| 2011/0161665 | A1* | 6/2011 | Perez | H04L 63/102 |
| | | | | 713/161 |
| 2012/0014386 | A1* | 1/2012 | Xiong | H04L 12/4675 |
| | | | | 370/392 |
| 2013/0182795 | A1* | 7/2013 | Cherian | H04L 61/2092 |
| | | | | 375/316 |
| 2013/0279371 | A1 | 10/2013 | Takashima et al. | |
| 2013/0315246 | A1* | 11/2013 | Zhang | H04L 12/56 |
| | | | | 370/392 |
| 2014/0016564 | A1* | 1/2014 | Liu | H04L 12/4641 |
| | | | | 370/328 |
| 2014/0025770 | A1* | 1/2014 | Warfield | G06F 16/134 |
| | | | | 709/213 |
| 2014/0215047 | A1* | 7/2014 | Li | H04L 47/2441 |
| | | | | 709/223 |
| 2014/0317684 | A1* | 10/2014 | Porras | H04L 63/20 |
| | | | | 726/1 |
| 2014/0365680 | A1* | 12/2014 | van Bemmel | H04L 67/327 |
| | | | | 709/232 |
| 2015/0071289 | A1* | 3/2015 | Shin | H04L 49/25 |
| | | | | 370/392 |
| 2015/0089032 | A1* | 3/2015 | Agarwal | H04L 61/2038 |
| | | | | 709/221 |
| 2015/0117451 | A1* | 4/2015 | Kaneriya | H04L 45/38 |
| | | | | 370/392 |
| 2015/0156107 | A1* | 6/2015 | Li | H04L 47/12 |
| | | | | 370/230 |
| 2015/0244607 | A1 | 8/2015 | Han | |
| 2015/0373688 | A1 | 12/2015 | Samuel Raj | |
| 2016/0006511 | A1* | 1/2016 | Slyne | H04Q 11/0067 |
| | | | | 398/58 |
| 2016/0065501 | A1* | 3/2016 | Watanabe | H04L 41/08 |
| | | | | 370/392 |
| 2016/0142365 | A1* | 5/2016 | Devarajan | H04L 45/72 |
| | | | | 370/392 |
| 2016/0162377 | A1* | 6/2016 | Fang | H04L 67/02 |
| | | | | 714/4.2 |
| 2016/0197876 | A1* | 7/2016 | Bui | H04L 61/103 |
| | | | | 370/392 |
| 2016/0226817 | A1 | 8/2016 | Kang et al. | |
| 2016/0261491 | A1* | 9/2016 | Gebhard | H04L 41/0806 |
| 2016/0261507 | A1* | 9/2016 | Kwak | H04L 47/125 |
| 2016/0277297 | A1 | 9/2016 | Chang | |
| 2016/0330167 | A1* | 11/2016 | Cai | H04L 67/2842 |
| 2017/0063696 | A1* | 3/2017 | Viquez | H04L 47/24 |
| 2017/0086191 | A1* | 3/2017 | Sipra | H04W 36/00 |
| 2017/0099188 | A1* | 4/2017 | Chang | H04L 63/102 |
| 2017/0126436 | A1* | 5/2017 | Du | H04L 41/5054 |
| 2017/0250869 | A1* | 8/2017 | Voellmy | H04L 43/14 |
| 2017/0272274 | A1* | 9/2017 | Onno | H04L 45/02 |
| 2017/0310551 | A1* | 10/2017 | Shin | G06F 16/955 |
| 2018/0167282 | A1* | 6/2018 | Reumann | H04L 61/6022 |
| 2018/0191679 | A1* | 7/2018 | Mulka | H04L 63/0236 |
| 2018/0192341 | A1* | 7/2018 | Tseng | H04W 36/0033 |
| 2018/0205673 | A1* | 7/2018 | Jain | H04L 45/34 |
| 2018/0219788 | A1* | 8/2018 | Wackerly | H04L 47/122 |
| 2019/0124038 | A1* | 4/2019 | Mahajan | H04L 67/2842 |
| 2020/0092207 | A1* | 3/2020 | Sipra | H04L 69/22 |
| 2020/0092254 | A1* | 3/2020 | Goeringer | H04L 45/46 |
| 2021/0006490 | A1* | 1/2021 | Michael | H04L 43/0864 |
| 2021/0176135 | A1* | 6/2021 | Rao | H04L 45/02 |

OTHER PUBLICATIONS

Korean Intellectual Property Office, "Notice of Preliminary Rejection" dated Apr. 19, 2021, in connection with Korean Patent Application No. 10-2017-0043696, 10 pages.
Notice of Patent Grant dated Sep. 27, 2021 in connection with Korean Patent Application No. 10-2017-0043696, 4 pages.

* cited by examiner

DEVICE AND METHOD FOR SETTING TRANSMISSION RULES OF DATA PACKET IN SOFTWARE DEFINED NETWORK

CROSS-REFERENCE TO RELATED APPLICATIONS

This application is a 371 National Stage of International Application No. PCT/KR2018/003981, filed Apr. 4, 2018, which claims priority to Korean Patent Application No. 10-2017-0043696, filed Apr. 4, 2017, the disclosures of which are herein incorporated by reference in their entirety.

BACKGROUND

1. Field

The disclosure relates to a software defined network (SDN) controller and a method for configuring, by the SDN controller, a transmission rule of a data packet transmitted between hosts in an SDN environment.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

As three main use cases for the 5G communication system, the telecommunications industry including the international telecommunication union (ITU) and 3rd generation partnership project (3GPP) has proposed enhanced mobile broadband (eMBB), ultra-reliable and low-latency communications (URLLC), and massive machine type communication.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In addition, a software defined network (SDN) environment or an SDN architecture is provided to improve the infrastructure of the 5G communication system. In the SDN environment, control of a network can be programmed, and the control and status of the network can be centralized. In addition, in the SDN environment, control and transmission functions of the network may be physically separated, and the underlying network infrastructure may be expanded into applications and network services.

SUMMARY

A software defined network (SDN) environment may include an SDN controller and an SDN switch.

The SDN switch may scan adjacent SDN switches by using a link detection protocol and transmit scanned information to the SDN controller.

The SDN controller may configure a topology of the entire network by adding up link information received from each SDN switch. The SDN controller may calculate a path through which a packet is to be transmitted, from the topology information. The SDN controller may generate a flow rule relating to the calculated packet transmission path, and transmit the flow rule to SDN switches on the packet transmission path so as to control the SDN switches to install the flow rule. A protocol used by the SDN controller to manage installation or deletion of the flow rule from the SDN switches may be referred to as an open flow protocol.

Meanwhile, there may be a reactive forwarding technique as a packet forwarding technique in a situation in which the SDN controller has topology information of the entire network. In relation to the reactive forwarding technique, a flow rule may be installed in each SDN switch at the time when a data packet is transmitted.

In the case of using the reactive forwarding technique, since all flow rules are not required to be pre-installed in an SDN switch, the use of a memory of the SDN switch can be reduced.

However, in the case of using the reactive forwarding technique, a problem may occur in that a data packet to be transmitted may be transferred to the SDN controller to increase a load of the SDN controller, and the transmission sequence of data packets may be changed.

Particularly, when a first data packet is transmitted to the SDN controller, the SDN controller may transmit a flow rule to each SDN switch. In this case, a time interval is generated until the flow rule is installed in the SDN switch, and the next data packet transmitted in the time interval may have a flow rule miss generated in the same manner as the first packet. Accordingly, the next data packet may also be transmitted to the SDN controller. As such, in the case where an unnecessary data packet is transmitted to the SDN controller, a load of the SDN controller is increased and, in serious cases, an operation failure of the SDN controller may occur.

In addition, a situation may occur in which the flow rule is installed in each SDN switch, and the next data packet is transferred to the SDN switch before the first data packet is transferred again to the switch from the SDN controller. In this case, the order of the data packets may be changed as the next data packet is first transmitted to a destination host, based on the flow rule. The change of the packet order may require the destination host to reassemble the packet order by buffering the data packets. In addition, if the destination host does not support a reassembling function of the packet order, an error in packet transmission may occur.

Accordingly, various embodiments of the disclosure provide a structure and a method for preventing situations in which, during a reactive forwarding process, a load of an SDN controller is increased and the packet order is changed, according to transmission of unnecessary packets.

In addition, a technical task to be achieved by the disclosure is not limited to the technical task mentioned above, and other technical tasks not mentioned may be clearly understood from the following description by a person skilled in the art to which the disclosure belongs.

According to various embodiments of the disclosure, a process of configuring a transmission rule of a data packet by a software defined network (SDN) controller includes: receiving a physical address request packet to enable a first host to communicate with a second host from a first network device connected to the first host; transmitting the received physical address request packet to a second network device connected to the second host; and when a physical address response packet including a physical address of the second host is received from the second network device, transmitting, to the first network device and the second network device, a flow rule relating to a transmission path of a data packet transmitted from the first host to the second host, wherein the flow rule has been generated based on a physical address of the first host and the physical address of the second host.

According to various embodiments of the disclosure, a method for configuring a transmission rule of a data packet by a software defined network (SDN) controller includes: receiving a physical address request packet to enable a first host to communicate with a second host from a first network device connected to the first host; transmitting the received physical address request packet to a second network device connected to the second host; when a physical address response packet including a physical address of the second host is received from the second network device in response to the physical address request packet, generating a flow rule relating to a transmission path of a data packet transmitted from the first host to the second host, based on a physical address of the first host and the physical address of the second host; and transmitting the generated flow rule to the first network device and the second network device such that the first network device and the second network device transfer the data packet, based on the flow rule.

According to various embodiments of the disclosure, a software defined network (SDN) controller includes: a memory configured to store a flow rule; a communication unit capable of communicating with a first network device connected to a first host and a second network device connected to a second host; and a processor configured to: control the communication unit to receive a physical address request packet to enable the first host to communicate with the second host from the first network device; control the communication unit to transmit the received physical address request packet to the second network device connected to the second host; and control the communication unit such that, when a physical address response packet including a physical address of the second host is received from the second network device in response to the physical address request packet, a flow rule relating to a transmission path of a data packet transmitted from the first host to the second host is transmitted to the first network device and the second network device, wherein the flow rule has been generated based on a physical address of the first host and the physical address of the second host.

According to various embodiments of the disclosure, a software defined network (SDN) controller includes: a communication unit capable of communicating with a first network device connected to a first host and a second network device connected to a second host; a processor electrically connected to the communication unit; and a memory, wherein the memory stores instructions for controlling such that, when the SDN controller operates, the processor receives a physical address request packet to enable the first host to communicate with the second host from the first network device through the communication unit, transmits the received physical address request packet to the second network device connected to the second host through the communication unit, when a physical address response packet including a physical address of the second host is received from the second network device in response to the physical address request packet, generates a flow rule relating to a transmission path of a data packet transmitted from the first host to the second host, based on a physical address of the first host and the physical address of the second host, and transmits the generated flow rule to the first network device and the second network device through the communication unit such that the first network device and the second network device transfer the data packet, based on the flow rule.

According to an embodiment of the disclosure, a flow rule for reactive forwarding can be installed without transmitting a data packet transmitted by a host to a software defined network (SDN) controller.

That is, the host can be prevented from transmitting an unnecessary data packet to the SDN controller for a reactive forwarding, and accordingly, a situation in which a load of the SDN controller is increased can be reduced.

In addition, since the data packet is not transmitted through the SDN controller, a situation, in which all data packets are transmitted through the same path and thus the order of the packets is changed, can also be prevented.

In addition, other effects obtained or expected by embodiments of the disclosure will be directly or implicitly disclosed in the detailed description of the embodiments of the disclosure. For example, various effects expected according to embodiments of the disclosure will be disclosed in the detailed description to be described later.

DETAILED DESCRIPTION

Figure 1:
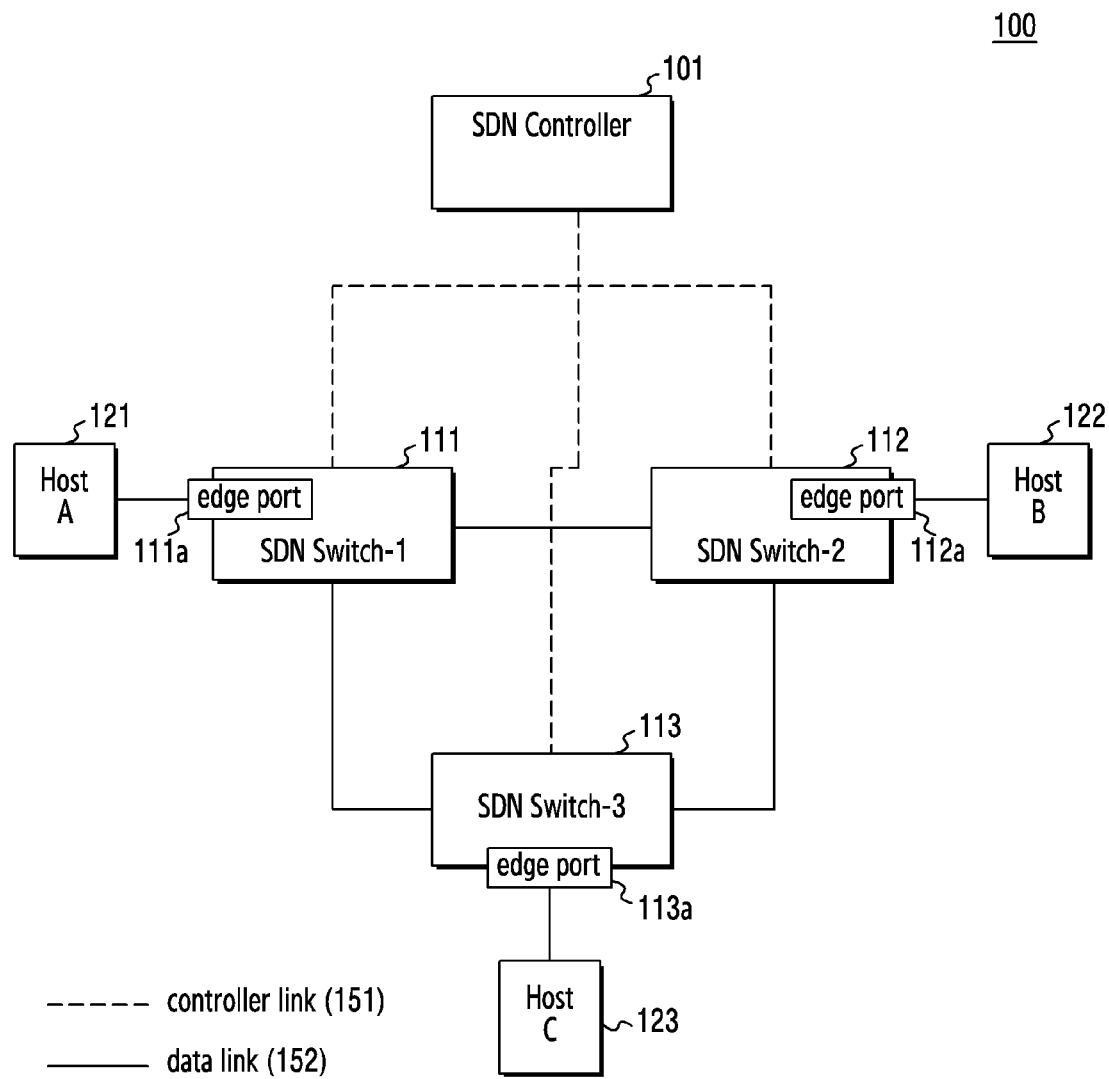
FIG. 1 illustrates a software defined network (SDN) environment according to an embodiment of the disclosure.

Hereinafter, operation principles of exemplary embodiments of the disclosure will be described in detail with reference to accompanying drawings. The same elements shown in the drawings are indicated by the same reference numerals as much as possible, although shown in different drawings. In the following description of an embodiment of the disclosure, when it is determined that a detailed description of a related known function or configuration may unnecessarily obscure the subject matter of the disclosure, the detailed description thereof will be omitted. The terms which will be described below are terms defined in consideration of the functions in an embodiment of the disclosure, and may vary depending on users, intentions of operators, or customs. Therefore, the definitions of the terms should be made based on the contents throughout the specification.

In addition, it will be understood that, in an embodiment of the disclosure, the singular forms such as "a/an" and "the" are intended to include the plural forms, unless the context clearly indicates otherwise.

Although the terms including an ordinal number such as first, second, etc. can be used for describing various elements, the structural elements are not restricted by the terms. The terms are used merely for the purpose of distinguishing one element from another element. For example, a first element could be termed a second element, and similarly, a second element could be also termed a first element without departing from the scope of the disclosure. As used herein, the term "and/or" includes any and all combinations of one or more associated items.

In addition, the terms used in an embodiment of the disclosure are merely used to describe particular embodiments, and are not intended to limit the disclosure. As used herein, the singular forms are intended to include the plural forms as well, unless the context clearly indicates otherwise. In the disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In addition, the terms "associated with" and "associated therewith" and derivatives thereof, used in an embodiment of the disclosure, may have meanings such as include, be included within, interconnect with, contain, be contained within, connect to or with, couple to or with, be communicable with, cooperate with, interleave, juxtapose, be proximate to, be bound to or with, have, and have a property of.

In addition, in an embodiment of the disclosure, when it is mentioned that "a first element is (functionally or communicatively) connected to" or "coupled" to a second element, the certain element may be directly connected to the other element or may be connected through another element (e.g., a third element).

Unless defined otherwise, all terms used herein, including technical and scientific terms, have the same meaning as those commonly understood by a person of ordinary skill in the art to which the disclosure pertains. Such terms as those defined in a generally used dictionary are to be interpreted to have the meanings equal to the contextual meanings in the relevant field of art, and are not to be interpreted to have ideal or excessively formal meanings unless clearly defined in various embodiments of the disclosure.

In the detailed description of the disclosure, an example of interpretable meanings of some terms used in the disclosure is proposed. However, it is noted that the terms are not limited to the examples of the construable meanings which are proposed below.

In the disclosure, a software defined network (SDN) control device or an SDN controller may be a device configured to control a network device in order to control the flow of a traffic or a packet. The SDN control device may be, for example, a server, but a physical form or location is not limited thereto.

In the disclosure, the network device may refer to an SDN switch or an SDN router. The network device may forward, switch, or route a packet.

In the disclosure, a host may be referred to as a terminal, a node, a user equipment (UE), a device, etc. as an entity which communicates with another host through the network device.

Hereinafter, embodiments according to the disclosure will be described in detail with reference to the accompanying drawings.

FIG. 1 illustrates an SDN environment according to an embodiment of the disclosure.

Referring to FIG. 1, an SDN environment 100 may include an SDN controller 101, a plurality of network devices 111 to 113, and a plurality of hosts 121 to 123.

The plurality of network devices 111 to 113 may be connected to the SDN controller 101 through a controller link 151. The plurality of network devices 111 to 113 may transmit or receive a packet to or from the SDN controller 101 through the control link 151.

In addition, the plurality of network devices 111 to 113 may be connected to each other through a data link 152. In addition, the plurality of hosts 121 to 123 may be connected to the plurality of network devices 111 to 113, respectively, through the data link 152. For example, each of the plurality of network devices 111 to 113 may be implemented as a switch.

The plurality of network devices 111 to 113 may transmit, to the SDN controller 101, information (e.g., an IP (Internet protocol) address, etc.) and port information of an adjacent network device connected thereto, through the data link 152. The SDN controller 101 may configure a network topology, based on the received network device information and port information. The SDN controller 101 may calculate a path through which a packet is to be transmitted, and thus generate a flow rule, based on the configuration of the network topology. The SDN controller 101 may install or uninstall the generated flow rule in each of the network devices on the path. The flow rule corresponds to information for controlling a transmission path of data, and may designate output requirements (e.g., the output port number, the next network device, etc.) for each condition (e.g., a source address or a destination address) of an input packet in each of the network devices included in the path.

In addition, the SDN controller 101 may identify a port which is connected to a host or a port which is not connected to the host among activated ports of the plurality of network devices 111 to 113, based on the received network device information and port information. In the disclosure, a port connected to a host may be referred to as an "edge port". In FIG. 1, the plurality of hosts 121 to 123 may be connected to a plurality of edge ports 111a to 113a of the plurality of network devices 111 to 113, respectively.

FIGS. 2 to 5D illustrate a process of configuring, by an SDN controller, a transmission rule of a data packet in an SDN environment according to an embodiment of the disclosure.

In FIGS. 2 to 5D, the SDN controller 101 may configure a transmission rule of a data packet by using address request packets and address response packets transmitted by hosts. The hosts 121 to 123 may convert a network layer address (e.g., an IP address) of a specific host into a physical address (e.g., a media access control (MAC) address), an adapter address, an Ethernet hardware address, etc. by using the address request packets and the address response packets.

Figure 2:
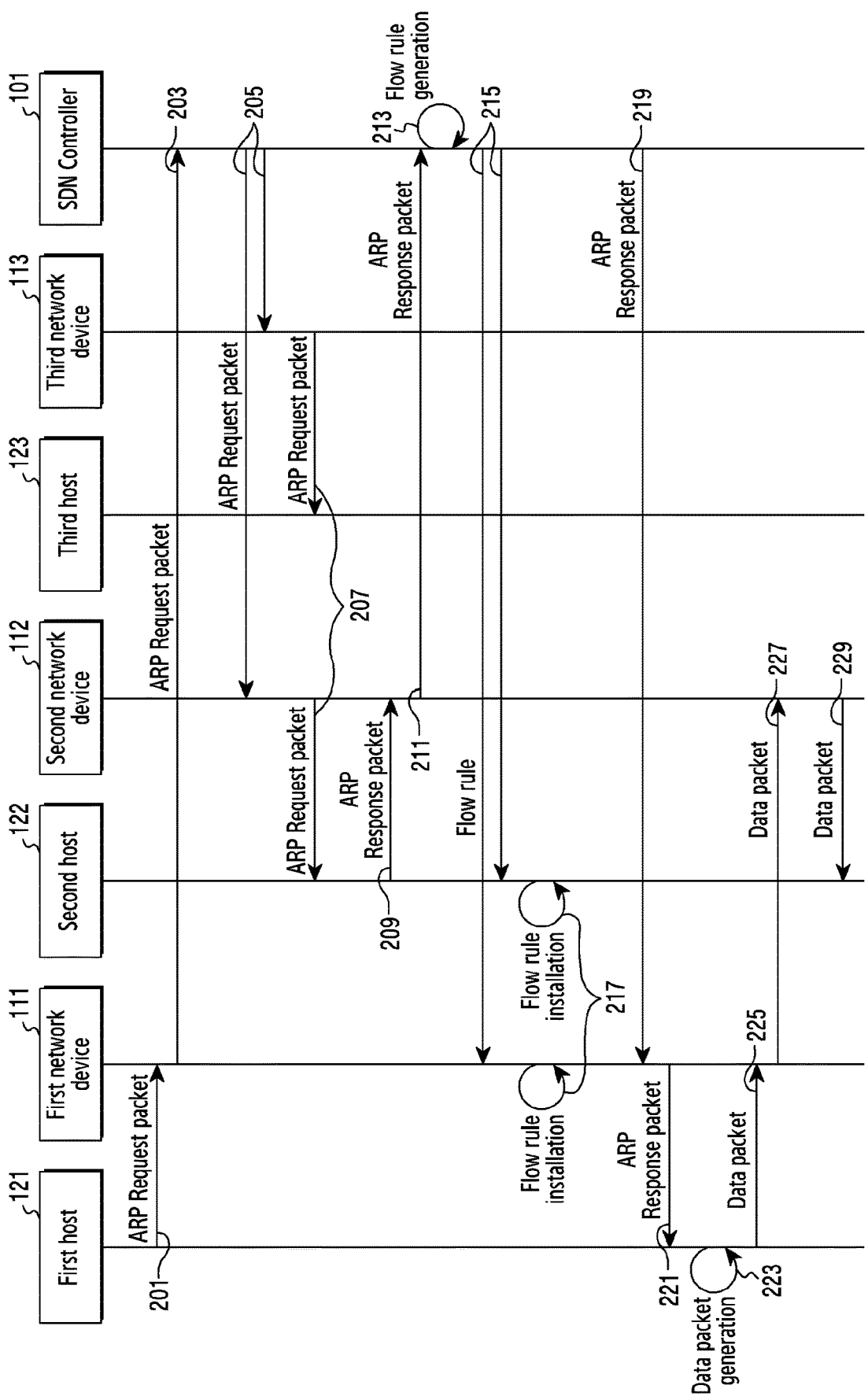
FIGS. 2 to 5D illustrate a process of configuring, by an SDN controller, a transmission rule of a data packet in an SDN environment, according to an embodiment of the disclosure.
Figure 3A:
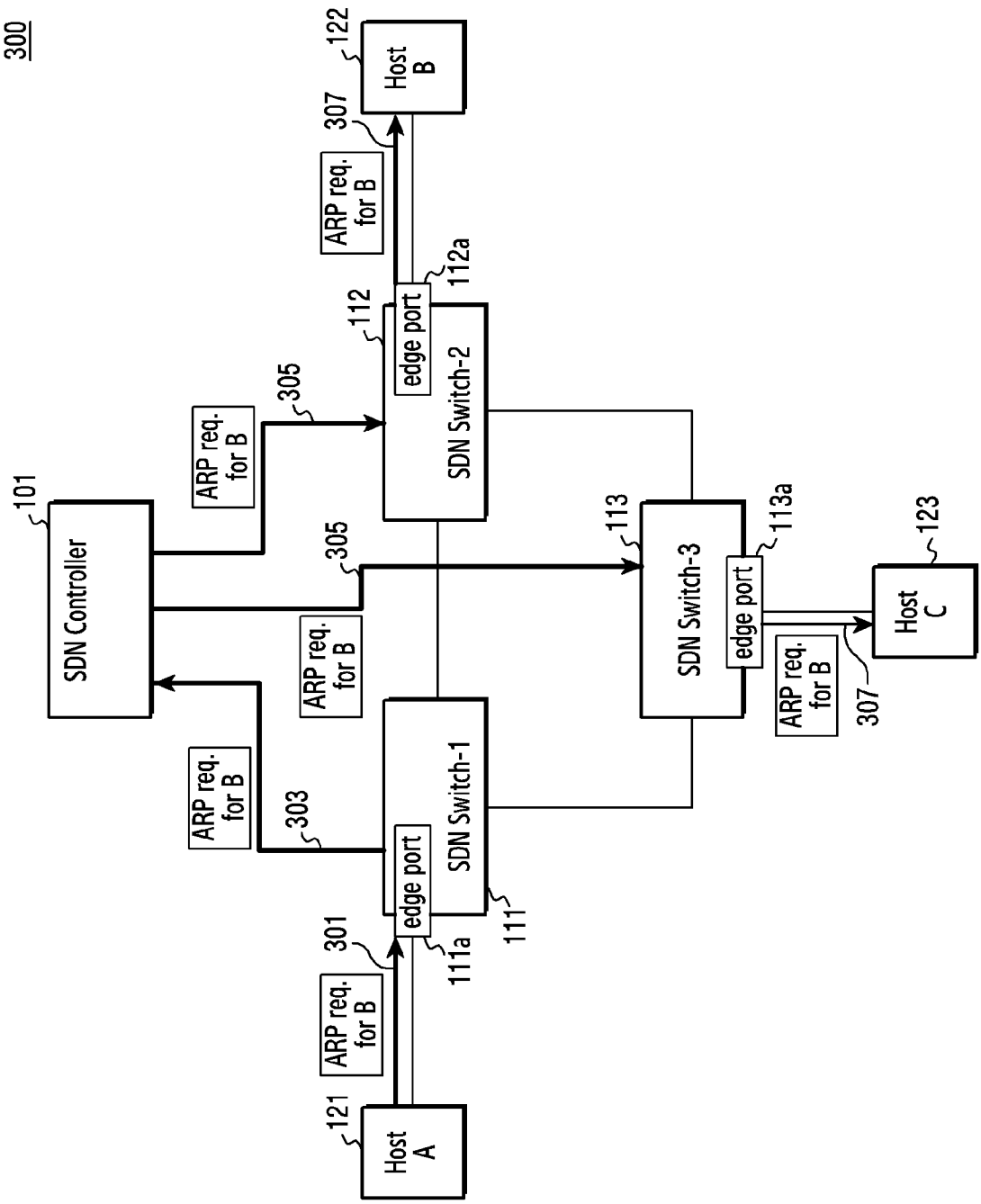
Figure 3B:
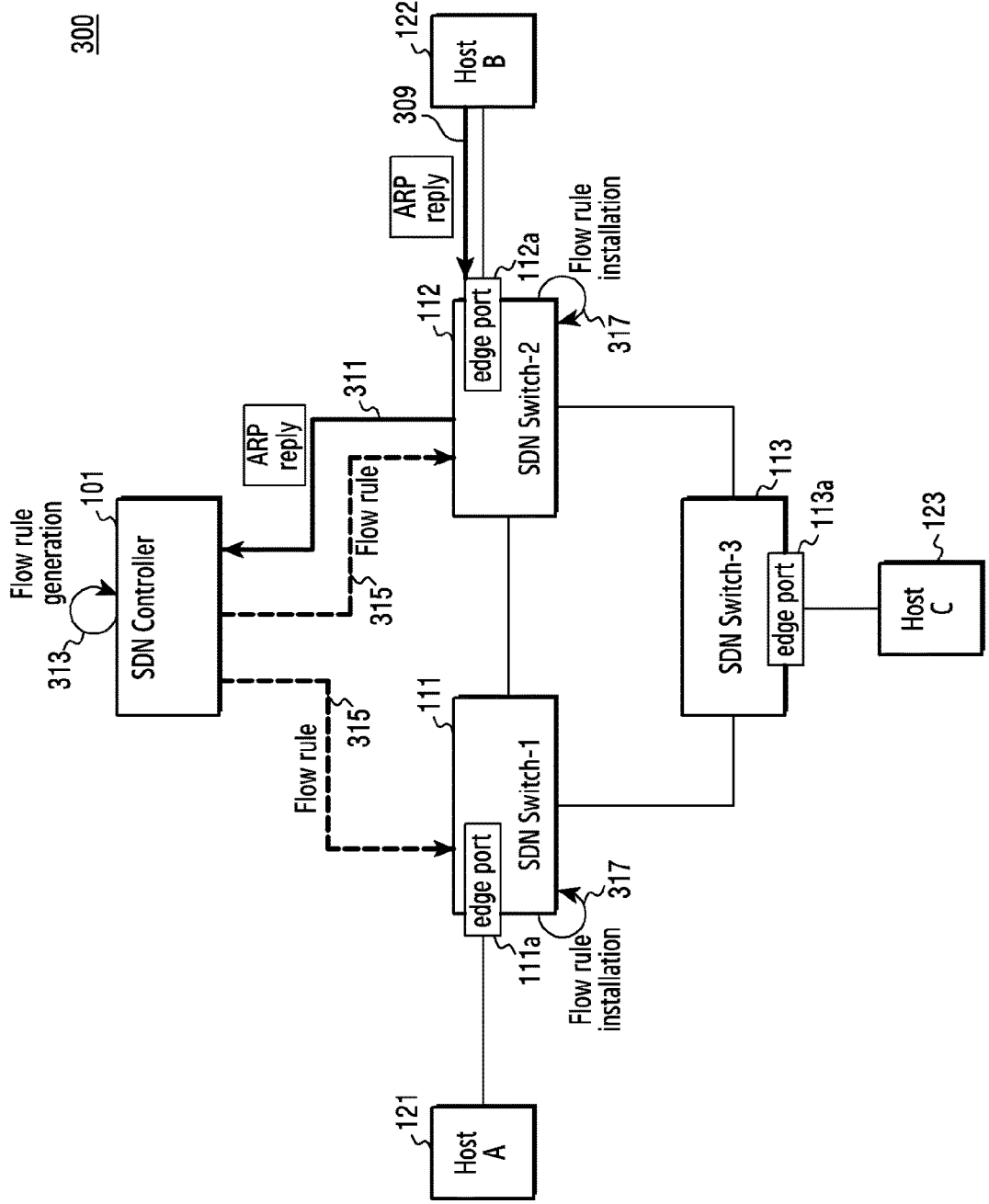
Figure 3C:
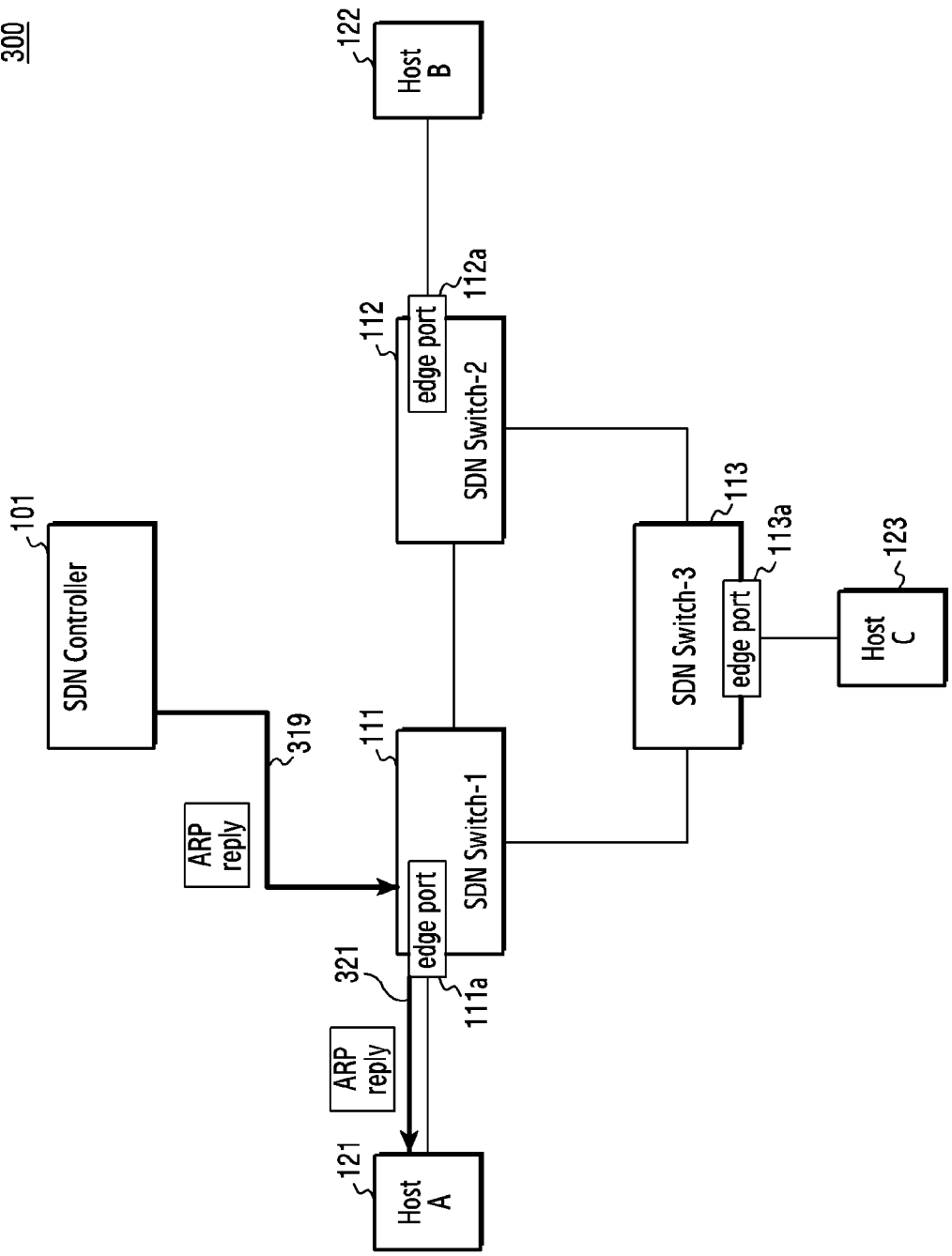
Figure 3D:
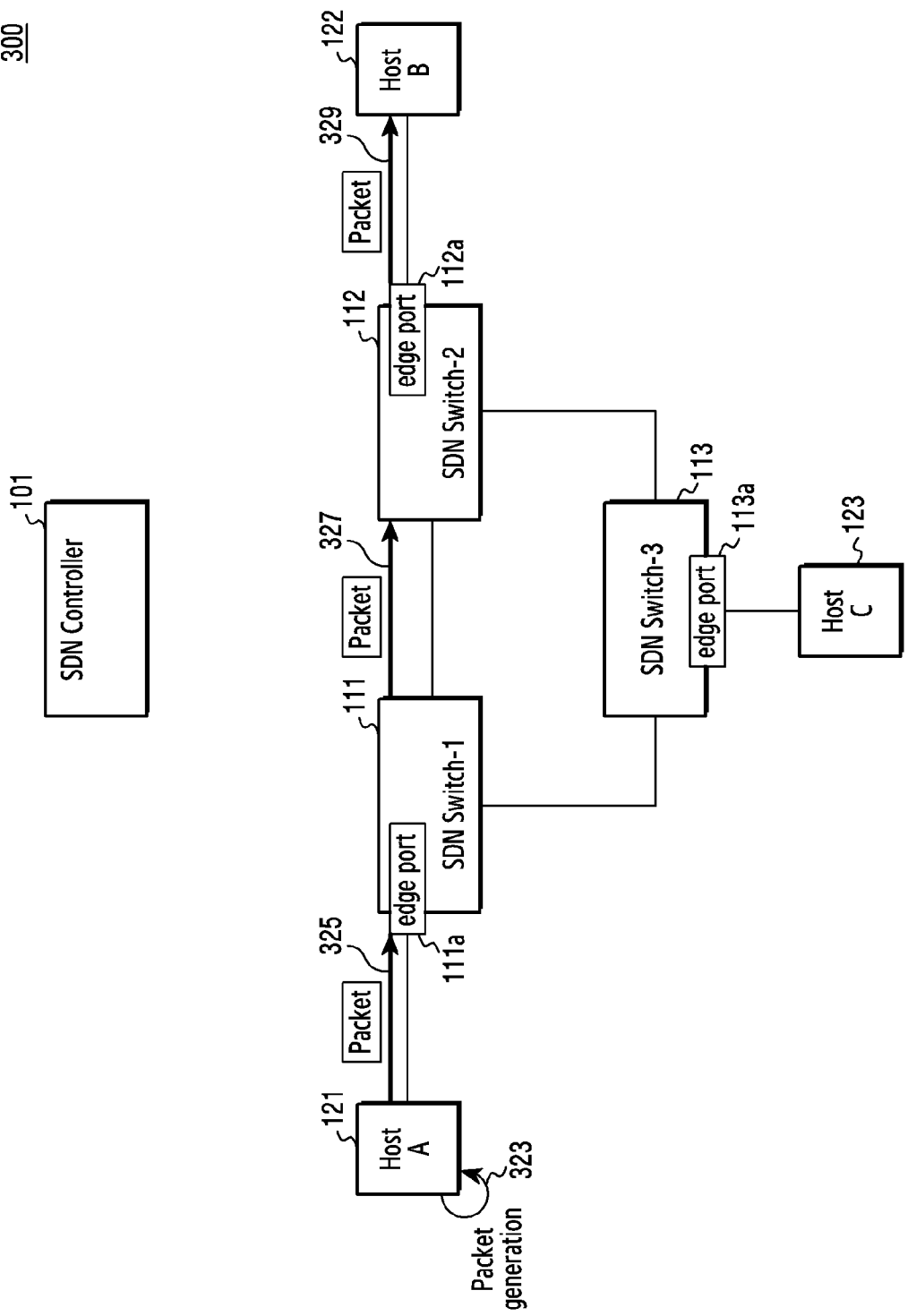
Figure 4:
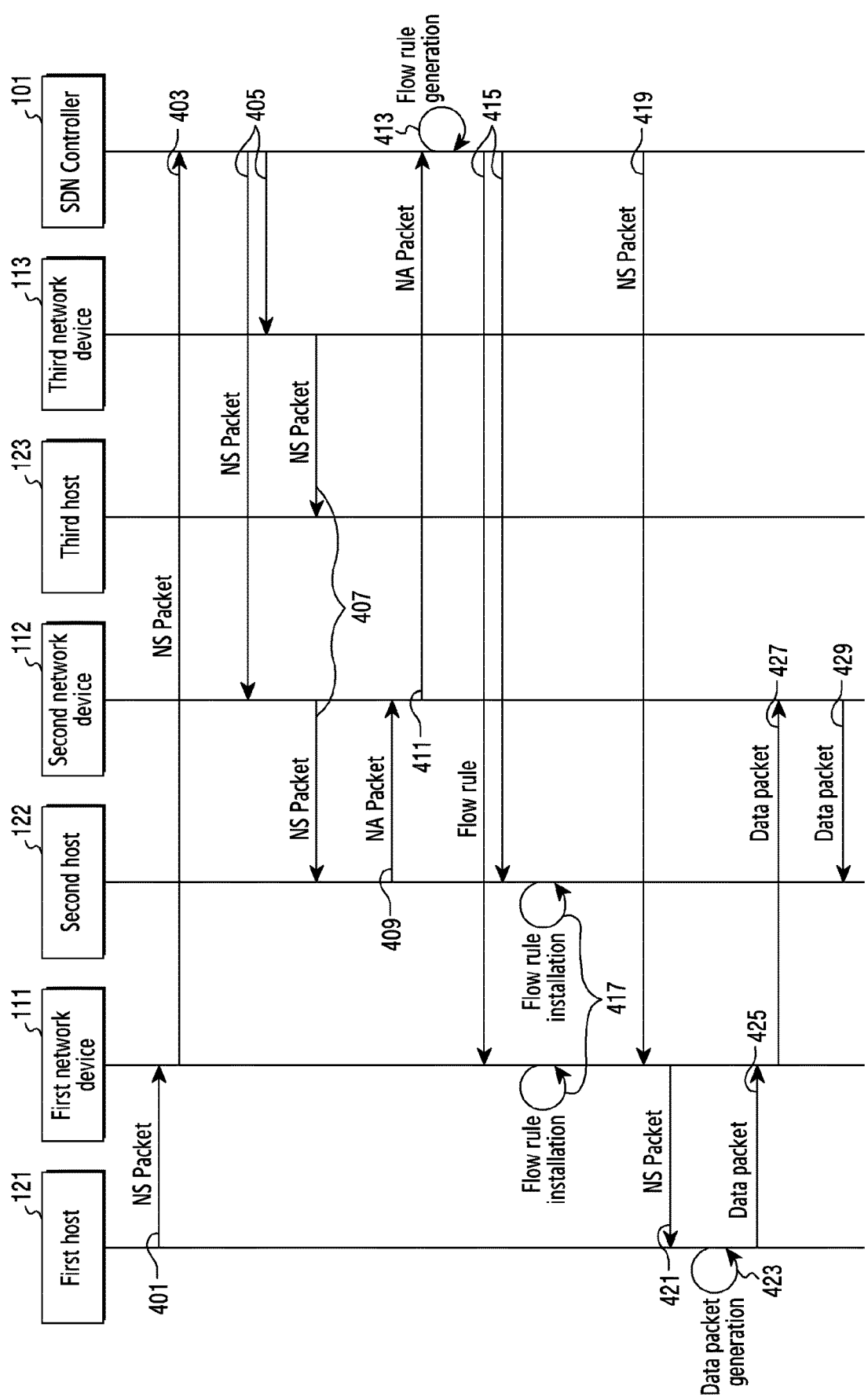

FIGS. 2 to 3D illustrate a process in which, in an IP version 4 (IPv4) network environment, the SDN controller 101 configures a transmission rule of a data packet by using an address resolution protocol (ARP) request packet and an ARP response packet as an address request packet and an address response packet, respectively. In addition, FIGS. 4 to 5D illustrate a process in which, in an IP version 6 (IPv6) network environment, the SDN controller 101 configures a transmission rule of a data packet by using a neighbor packet (NS) packet and a neighbor advertisement (NA) packet of a neighbor discovery protocol (NDP) as an address request packet and an address response packet, respectively.

First, FIGS. 2 to 3D illustrate a method for configuring a transmission rule of a data packet according to an embodiment of the disclosure in an IP version 4 (IPv4) network environment.

In FIGS. 3A to 3D, an SDN controller 101, a plurality of network devices 111 to 113, and a plurality of hosts 121 to 131 may correspond to the SDN controller 101, the plurality of network devices 111 to 113, and the plurality of hosts 121 to 131 of FIG. 1, respectively, and thus the repeated description will be omitted.

First, in operation 201 of FIG. 2 and operation 301 of FIG. 3A, in order to acquire a MAC address of the second host 122, the first host 121 may transmit an ARP request packet to the first network device 111 to be forwarded to the second host 122 as a destination. The ARP request packet may include, for example, an IP address of the second host 122. In this case, the first host 121 may check an ARP cache table of its own network adapter, and transmit the ARP request packet to the first network device 111 when there is no mapping entry for the second host 122 in the ARP table.

In operation 203 of FIG. 2 and operation 303 of FIG. 3A, the first network device 111 may transfer the received ARP request packet to the SDN controller 101.

In operation 205 of FIG. 2 and operation 305 of FIG. 3A, the SDN controller 101 may transmit the received ARP request packet to the second and third network devices 112 and 113 which each have an edge port connected to a host.

In operation 207 of FIG. 2 and operation 307 of FIG. 3A, the second and third network devices 112 and 113 may transmit the received ARP request packet to the second and third hosts 122 and 123 connected thereto.

The second and third hosts 122 and 123 may determine whether a destination IP address included in the received ARP request packet is identical to its own IP address.

In operation 209 of FIG. 2 and operation 309 of FIG. 3B, the second host 122 having the identical IP address may transmit an ARP response packet including its own MAC address to the second network device to be forwarded to the first host 121 as a destination.

In operation 211 of FIG. 2 and operation 311 of FIG. 3B, the second network device 112 may transmit the received ARP response packet to the SDN controller 101.

In operation 213 of FIG. 2 and operation 313 of FIG. 3B, the SDN controller 101 may generate a flow rule relating to a path through which a data packet received from the first host 121 is to be transmitted to the second host 122, based on the ARP response packet.

Particularly, the SDN controller 101 may identify a source MAC address and a destination MAC address of the packet, based on a MAC address of the first host 121 and the MAC address of the second host 122 included in the ARP response packet. In this case, the source MAC address of the packet may be the MAC address of the first host 121, which is the destination MAC address included in the ARP response packet. In addition, the destination MAC address of the packet may be the MAC address of the second host 122, which is the source MAC address included in the ARP response packet. The SDN controller 101 may calculate a path through which a data packet having a source MAC address and a destination MAC address is to be transmitted. For example, the path may be determined in consideration of at least one of physical locations, loads, and capacities of the network devices such that a packet transmission time is shortest. Further, the SDN controller 101 may generate a flow rule according to the calculation result.

In operation 215 of FIG. 2 and operation 315 of FIG. 3B, the SDN controller 101 may transmit the flow rule to the first and second network devices 111 and 112 which are network devices on the path included in the flow rule, such that the first network device 111 and the second network device 112 transmit the data packet, based on the generated flow rule.

In 217 operation of FIG. 2 and operation 317 of FIG. 3B, each of the first and second network devices 111 and 112 may install the received flow rule.

In operation 219 of FIG. 2 and operation 319 of FIG. 3C, the SDN controller 101 may transmit, to the first network device 111, the ARP response packet received from the second network device 112. In this case, operation 219 of FIG. 2 and operation 319 of FIG. 3C may be performed first before operation 213 of FIG. 2 and operation 313 of FIG. 3B. Otherwise, operation 219 of FIG. 2 and operation 319 of FIG. 3C may be performed first before operation 215 of FIG. 2 and operation 315 of FIG. 3B.

In operation 221 of FIG. 2 and operation 321 of FIG. 3C, the first network device 111 may transmit the received ARP response packet to the first host 121.

The first host 121 may acquire (or learn) the MAC address of the first host 122 from the received ARP response packet.

In operation 223 of FIG. 2 and operation 323 of FIG. 3D, the first host 121 may generate a data packet by using the acquired MAC address.

In operation 225 of FIG. 2 and operation 325 of FIG. 3D, the first host 121 may generate the generated data packet to the first network device 112.

In operation 227 of FIG. 2 and operation 327 of FIG. 3D, the first network device 111 may transmit the received data packet to the second network device 112 by using the flow rule installed at operation 217 of FIG. 2 and operation 317 of FIG. 3B.

In operation 229 of FIG. 2 and operation 329 of FIG. 3D, the second network device 112 may also transmit the received data packet to the second host 122 by using the flow rule installed at operation 217 of FIG. 2 and operation 317 of FIG. 3B.

FIGS. 4 to 5D illustrate a method for configuring a transmission rule of a data packet according to an embodiment of the disclosure in an IP version 6 (IPv6) network environment.

In FIGS. 5A to 5D, an SDN controller 101, a plurality of network devices 111 to 113, and a plurality of hosts 121 to 131 may correspond to the SDN controller 101, the plurality of network devices 111 to 113, and the plurality of hosts 121 to 131 of FIG. 1, respectively, and thus he repeated description will be omitted.

Figure 5A:
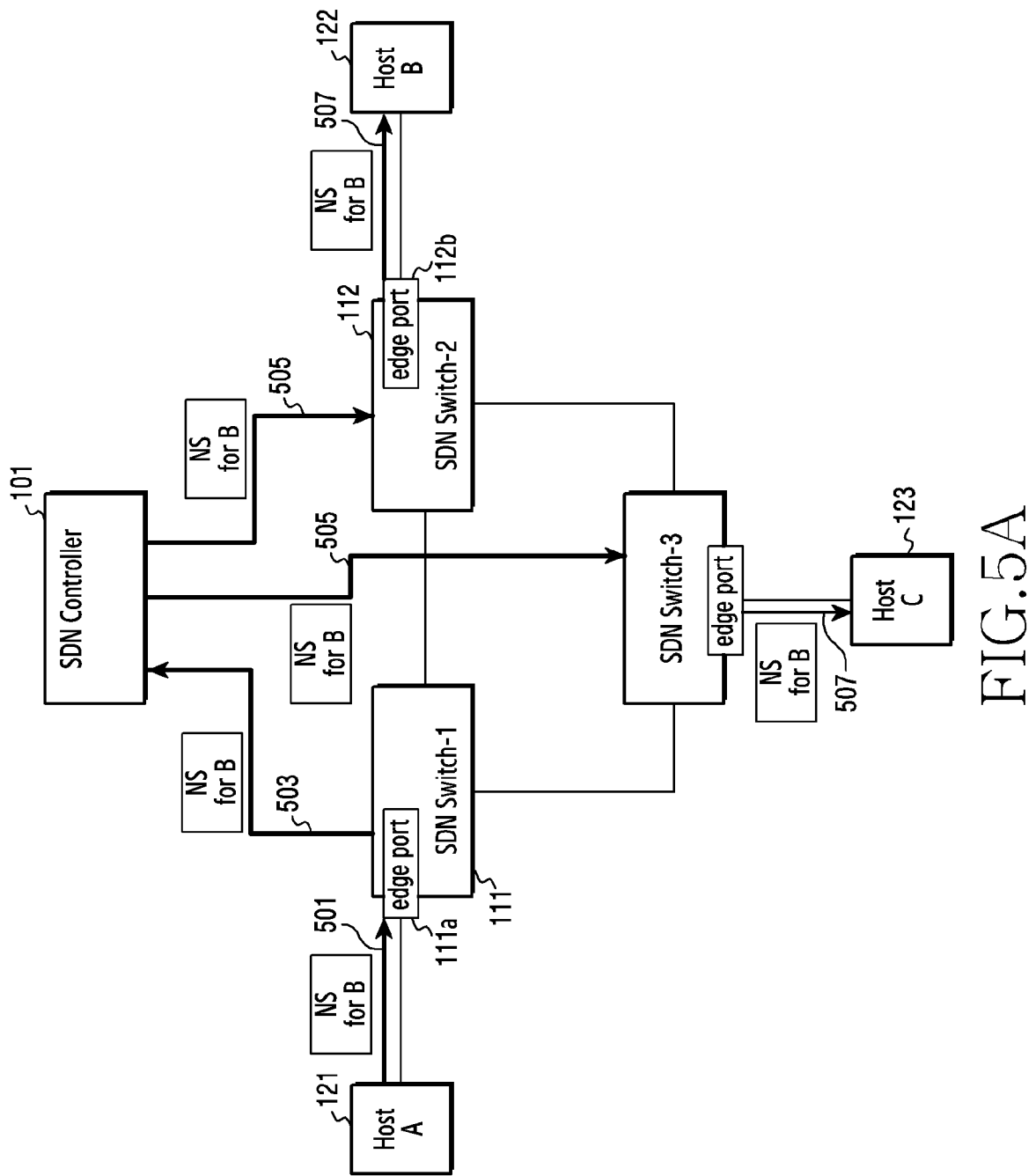

First, in operation 401 of FIG. 4 and operation 501 of FIG. 5A, in order to acquire a MAC address of the second host 122, the first host 121 may transmit an NS packet to the first network device 111 to be forwarded to the second host 122 as a destination. The NS packet may include, for example, an IP address of the second host 121.

In operation 403 of FIG. 4 and operation 503 of FIG. 5A, the first network device 111 may transmit the received NS packet to the SDN controller 101.

In operation 405 of FIG. 4 and operation 505 of FIG. 5A, the SDN controller 101 may transmit the received NS packet to the second and third network devices 112 and 113 which each have an edge port connected to a host.

In operation 407 of FIG. 4 and operation 507 of FIG. 5A, the second and third network devices 112 and 113 may transmit the received NS packet to the second and third hosts 122 and 123 connected thereto.

The second and third hosts 122 and 123 may determine whether a destination IP address included in the received NS request packet is identical to its own IP address.

Figure 5B:
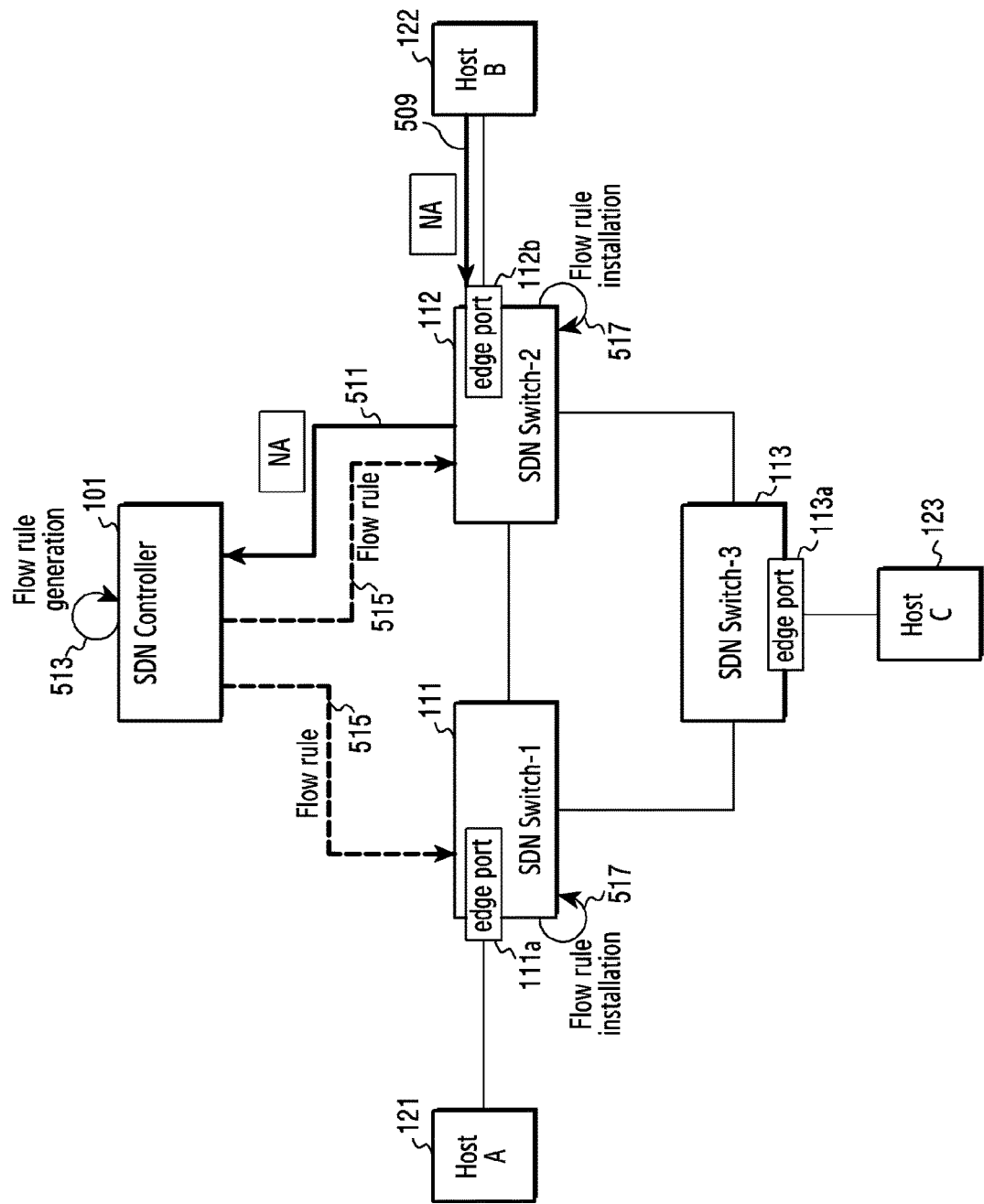

In operation 409 of FIG. 4 and operation 509 of FIG. 5B, the second host 122 having the identical IP address may transmit an NA packet including its own MAC address to the second network device 112 to be forwarded to the first host 121 as a destination.

In operation 411 of FIG. 4 and operation 511 of FIG. 5B, the second network device 112 may transmit the received NA packet to the SDN controller 101.

In operation 413 of FIG. 4 and operation 513 of FIG. 5B, the SDN controller 101 may generate a flow rule relating to a path through which a data packet received from the first host 121 is to be transmitted to the second host 122, based on the NA packet.

Particularly, the SDN controller 101 may identify a source MAC address and a destination MAC address of the packet, based on a MAC address of the first host 121 and the MAC address of the second host 122 included in the NA packet, and generate a flow rule relating to a path through which a data packet having a source MAC address and a destination MAC address is to be transmitted.

In operation 415 of FIG. 4 and operation 515 of FIG. 5B, the SDN controller 101 may transmit the flow rule to the first and second network devices 111 and 112 which are network devices on the path included in the flow rule, such that the first network device 111 and the second network device 112 transmit the data packet, based on the generated flow rule.

In operation 417 of FIG. 4 and operation 517 of FIG. 5B, each of the first and second network devices 111 and 112 may install the received flow rule.

Figure 5C:
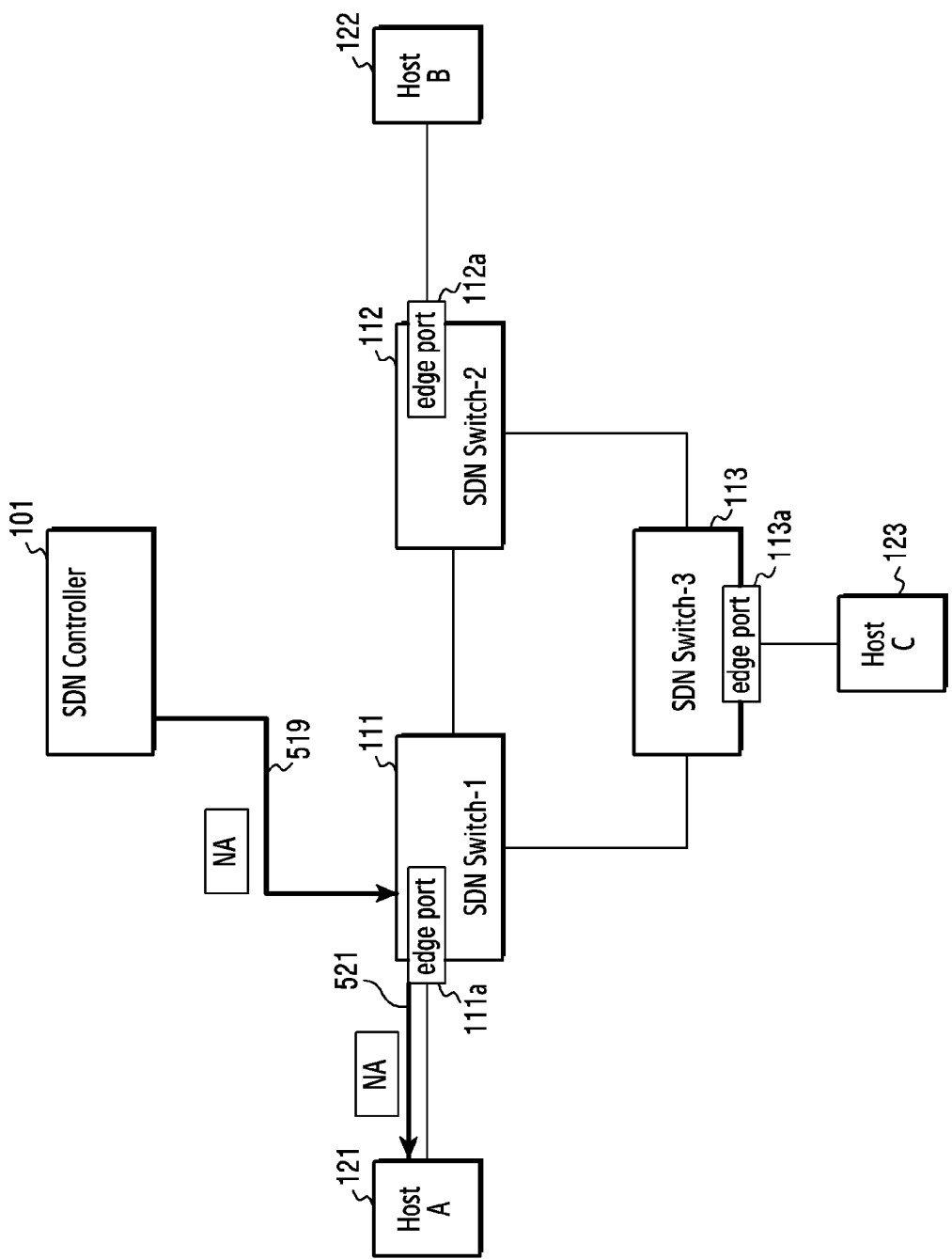
Figure 5D:
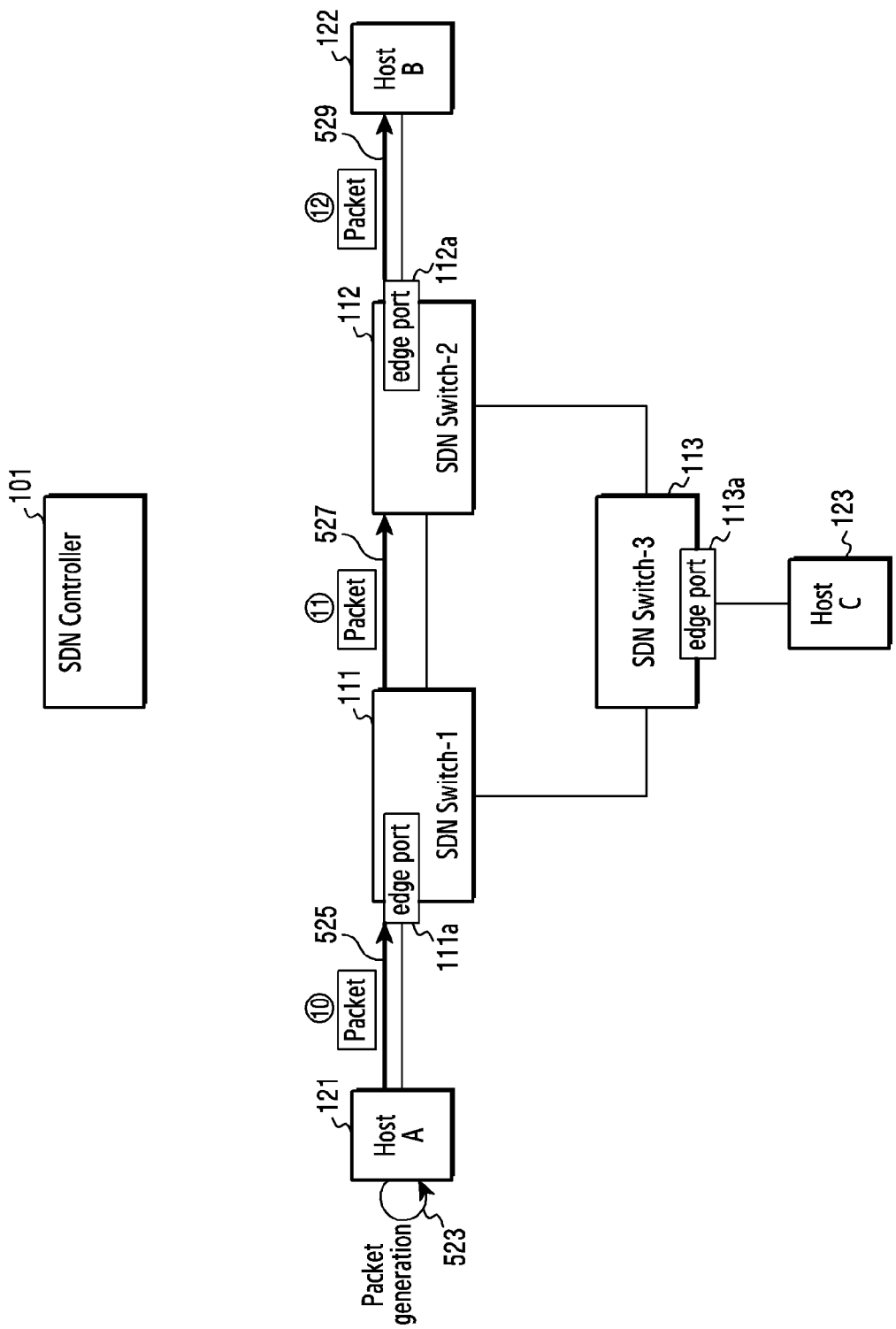

In operation 419 of FIG. 4 and operation 519 of FIG. 5C, the SDN controller 101 may transmit, to the first network device 111, the NA response packet received from the second network device 112. In this case, operation 419 of FIG. 4 and operation 519 of FIG. 5C may be performed first before operation 413 of FIG. 4 and operation 513 of FIG. 5B. Otherwise, operation 419 of FIG. 4 and operation 519 of FIG. 5C may be performed first before operation 415 of FIG. 4 and operation 515 of FIG. 5B.

In operation 421 of FIG. 4 and operation 521 of FIG. 5C, the first network device 111 may transmit the received NA packet to the first host 121.

The first host 121 may acquire (or learn) the MAC address of the first host 122 from the received NA packet.

In operation 423 of FIG. 4 and operation 523 of FIG. 5D, the first host 121 may generate a data packet by using the acquired MAC address.

In operation 425 of FIG. 4 and operation 525 of FIG. 5D, the first host 121 may transmit the generated data packet to the first network device 112.

In operation 427 of FIG. 4 and operation 527 of FIG. 5D, the first network device 111 may transmit the received data packet to the second network device 112 by using the flow rule installed at operation 417 of FIG. 4 and operation 517 of FIG. 5B.

In operation 429 of FIG. 4 and operation 529 of FIG. 5D, the second network device 112 may also transmit the received data packet to the second host 122 by using the flow rule installed at operation 417 of FIG. 4 and operation 517 of FIG. 5B.

As such, as a situation in which the data packet is not transmitted to the SDN controller does not occur, an unnecessary data packet may not be transmitted to the SDN controller in a reactive forwarding process. Further, a situation in which the transmission sequence of data packets is changed can be prevented.

Figure 6:
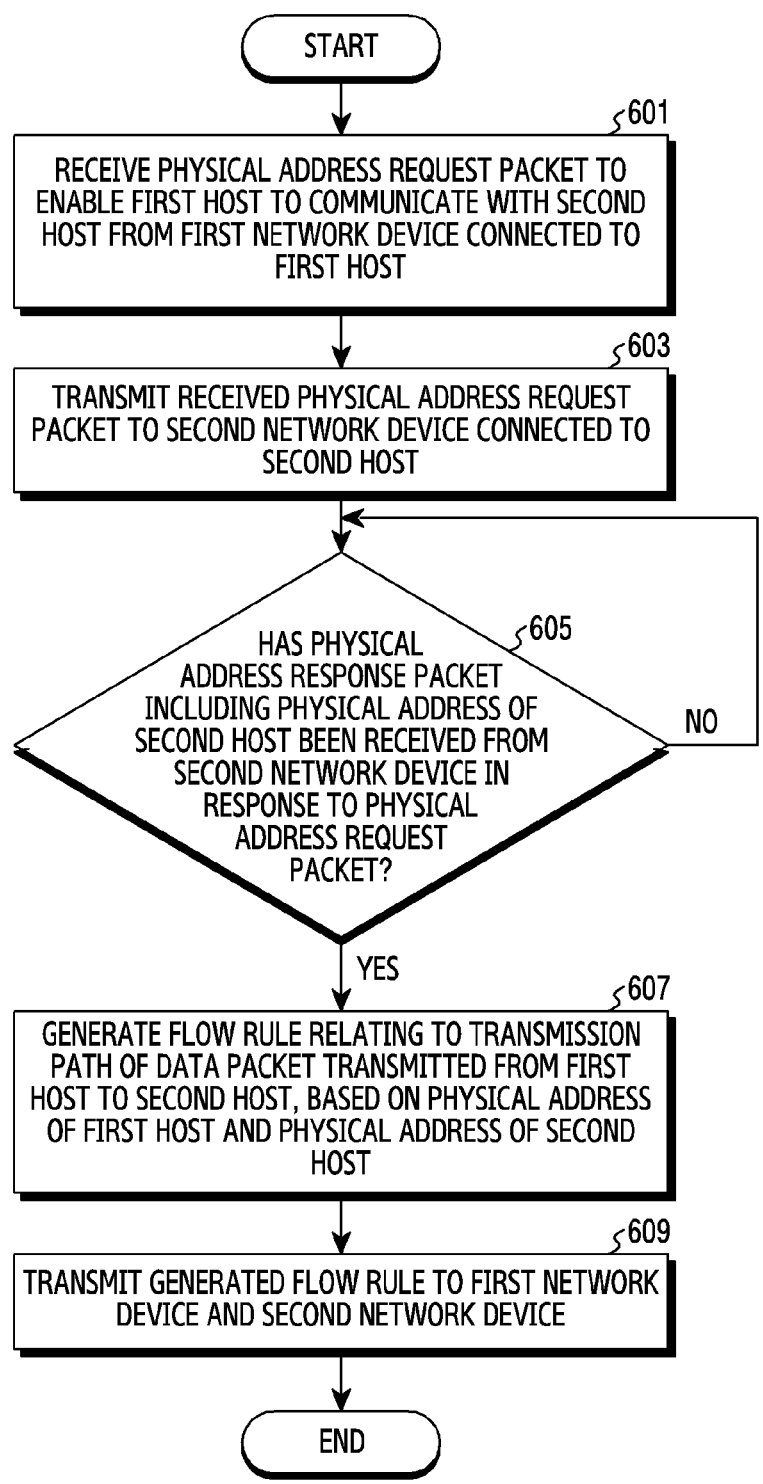
FIG. 6 is a flowchart of an SDN controller according to an embodiment of the disclosure.

FIG. 6 is a flowchart of an SDN controller according to an embodiment of the disclosure. FIG. 6 illustrates a method for operating the SDN controller 101.

Referring to FIG. 6, in operation 601, the SDN controller may receive a physical address request packet to enable a first host to communicate with a second host, from a first network device connected to the first host. For example, the physical address request packet may be an ARP request packet of an IPv4 network or an NS packet of an IPv6 network. Further, for example, a physical address may include a MAC address.

In operation 603, the SDN controller may transmit the received physical address request packet to a second network device connected to the second host. In this case, the physical address request packet may include an IP address of the second host.

In operation 605, the SDN controller may determine whether a physical address response packet including a physical address of the second host is received from the second network device in response to the physical address request packet. For example, the physical address response packet may be an ARP response packet of an IPv4 network or an NA packet of an IPv6 network.

In the case where the physical address response packet is received, in operation 607, the SDN controller may generate a flow rule relating to a transmission path of a data packet transmitted from the first host to the second host, based on a physical address of the first host and the physical address of the second host. For example, the SDN controller may determine a source MAC address and a destination MAC address, based on a MAC address of the first host and a MAC address of the second host. The SDN controller may generate a flow rule by using the determined source MAC address and destination MAC address. Additionally, although not shown in FIG. 6, the SDN controller may transmit the received physical address response packet to the first network device so that the first host acquires the physical address of the second host.

In operation 609, the SDN controller may transmit the generated flow rule to the first network device and the second network device. Accordingly, the first network device and the second network device may transmit the data packet received from the first host to the second host, based on the received flow rule. In this case, the data packet may have the physical address of the first host as a source MAC address and the physical address of the second host as a destination MAC address.

Figure 7:
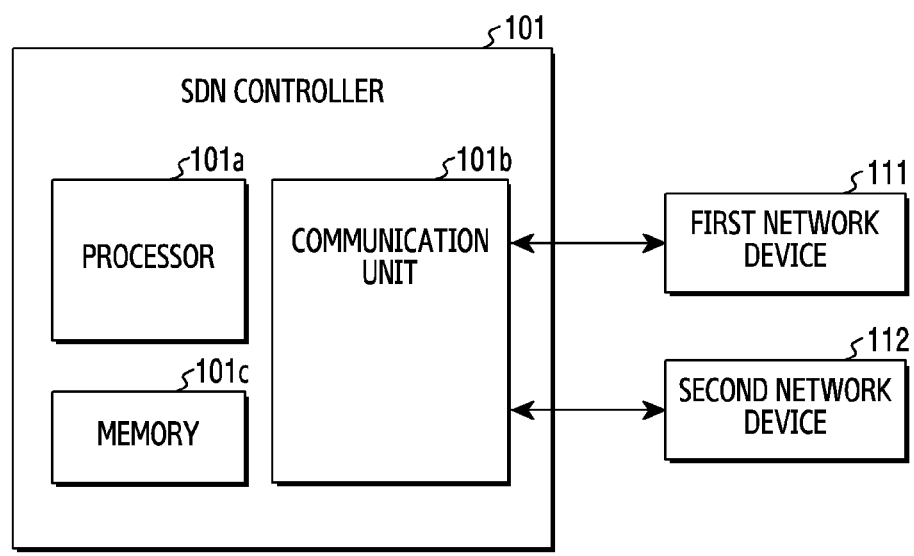
FIG. 7 is a block diagram of an SDN controller according to an embodiment of the disclosure.

FIG. 7 is a block diagram of an SDN controller according to an embodiment of the disclosure. FIG. 7 may be understood as a configuration of the SDN controller 101.

Referring to FIG. 7, a packet may be transmitted or received between the SDN controller 101 and the first and second network devices 111 and 112 through a control link. To this end, the SDN controller 101 may include a processor 101$a$, a communication unit 101$b$, and a memory 101$c$. The SDN controller 101 may be configured by one or more physically separated servers. For example, at least one or more of the processor 101$a$, the communication unit 101$b$, and the memory 101$c$ may be separated from each other and connected in a wired or wireless communication manner.

The processor 101$a$ may control the overall operation of the SDN controller 101 and configure a transmission rule of a data packet according to an embodiment of the disclosure. The processor (or controller) 101$a$ may include one or more of a central processing unit, an application processor, and a communication processor (CP). The processor 101a, for example, may carry out operations or data processing relating to the control and/or communication of at least one other element of the SDN controller 101.

According to various embodiments, the processor 101a may read and execute instructions stored in the memory 101c. For example, the processor 101a may receive a physical address request packet to enable the first host to communicate with the second host from the first network device 111 through the communication unit 101b. The processor 101a may transmit the received physical address request packet to the second network device 112 connected to the second host through the communication unit 101b. When a physical address response packet including a physical address of the second host is received from the second network device 112 in response to the physical address request packet, the processor 101a may generate a flow rule relating to a transmission path of a data packet transmitted from the first host to the second host, based on a physical address of the first host and the physical address of the second host. The processor 101a may transmit the generated flow rule to the first network device 111 and the second network device 112 through the communication unit 101b such that the first network device 111 and the second network device 112 transmit the data packet, based on the flow rule.

The communication unit 101b may receive various signals, messages, and data from other entities according to the control of the processor 101a. In addition, the communication unit 101b may perform a function of transmitting a signal processed by the processor 101a to another entity. The communication unit 101b may perform functions for receiving a signal through a wireless or wired channel. The communication unit 101b may include a transceiver configured to transmit and receive a signal. For example, the communication unit 101b may perform at least one function among equalization, channel estimation, fast Fourier transform (FFT), cyclic prefix (CP) removal, decoding, demodulation, frequency conversion, and reception of a radio frequency (RF) signal. The communication unit 101b may include, for example, at least one of a cellular module, a wireless fidelity (Wi-Fi) module, a Bluetooth module, a global navigation satellite system (GNSS) module, a near field communication (NFC) module, and an RF module. According to an embodiment, at least some (e.g., two or more) of the cellular module, Wi-Fi module, Bluetooth module, GNSS module, and NFC module may be included in one integrated chip (IC) or an IC package. The communication unit 101b may be referred to as a "transmitter", a "receiver", or a "transceiver".

The memory 101c may include a volatile memory and/or a non-volatile memory. The memory 101c may store, for example, commands or data related to at least one other element of the SDN controller 101. According to an embodiment, the memory 101c may store software and/or a program. In addition, the memory 101c may store a flow rule generated based on a physical address of the first host and a physical address of the second host.

According to various embodiments, the memory 101c may store instructions for controlling such that, when the SDN controller 101 operates, the processor 101a receives a physical address request packet to enable the first host to communicate with the second host from the first network device 111 through the communication unit 101b, transmits the received physical address request packet to the second network device 112 connected to the second host through the communication unit 101b, when a physical address response packet including a physical address of the second host is received from the second network device 112 in response to the physical address request packet, generates a flow rule relating to a transmission path of a data packet transmitted from the first host to the second host, based on a physical address of the first host and the physical address of the second host, and transmits the generated flow rule to the first network device 111 and the second network device 112 through the communication unit 101b such that the first network device 111 and the second network device 112 transmit the data packet, based on the flow rule.

According to various embodiments, the memory 101c may include instructions for controlling such that, when the SDN controller 101 operates, the processor 101a determines a source MAC address and a destination MAC address, based on a physical address of the first host and a physical address of the second host, and generates a flow rule by using the determined source MAC address and destination MAC address.

According to various embodiments, the memory 101c may further store instructions for controlling such that, when the SDN controller 101 operates, the processor 101a transmits a received physical address response packet to the first network device through the communication unit 101b so as to allow the first host to acquire a physical address of the second host.

According to various embodiments, the processor 101a may control the communication unit 101b to receive a physical address request packet to enable the first host to communicate with the second host from the first network device 111. Further, the processor 101a may control the communication unit 101b to transmit the received physical address request packet to the second network device 112 connected to the second host. When a physical address response packet including a physical address of the second host is received from the second network device 112 in response to the physical address request packet, the processor 101a may control the communication unit 101b such that a flow rule relating to a transmission path of a data packet transmitted from the first host to the second host is transmitted to the first network device 111 and the second network device 112, wherein the flow rule has been generated based on a physical address of the first host and the physical address of the second host. The flow rule may be generated using a source MAC address and a destination MAC address, which are determined based on the physical address of the first host and the physical address of the second host.

The disclosed embodiments may be implemented as an S/W program including instructions stored in computer-readable storage media.

A computer is a device capable of calling a stored instruction from storage media and performing an operation of the disclosed embodiment according to the called instruction, and may include an electronic device according to the disclosed embodiments.

The computer-readable storage media may be provided in the form of non-transitory storage media. The term "non-transitory" only means that the storage media is tangible without including a signal, irrespective of whether data is semi-permanently or transitorily stored in the storage media.

In addition, a method according to the disclosed embodiments may be provided as a computer program product. The computer program product may be traded as a product between a seller and a buyer.

The computer program product may include an S/W program and a computer readable storage medium in which an S/W program is stored. For example, the computer program product may include a product (e.g., a downloadable app) in the form of an S/W program, which is distributed electronically through a manufacturer of an electronic device or an electronic market (e.g., Google Play Store, and App Store). For electronic distribution, at least a part of an S/W program may be stored in a storage medium or temporarily generated. The storage medium may include a storage medium of a server of a manufacturer, a server of an electronic market, or a relay server which temporarily stores an SW program.

According to an embodiment, the computer program product may include a computer-readable recording medium including instructions for allowing an SDN controller of the disclosure to perform the operations of: receiving a physical address request packet to enable a first host to communicate with a second host from a first network device connected to the first host; transmitting the received physical address request packet to a second network device connected to the second host; when a physical address response packet including a physical address of the second host is received from the second network device in response to the physical address request packet, generating a flow rule relating to a transmission path of a data packet transmitted from the first host to the second host, based on a physical address of the first host and the physical address of the second host; and transmitting the generated flow rule to the first network device and the second network device such that the first network device and the second network device transfer the data packet, based on the flow rule.

In the above-described detailed embodiments of the disclosure, a component included in the disclosure is expressed in the singular or the plural form according to a presented detailed embodiment. However, the singular form or plural form is selected for convenience of description suitable for the presented situation, and various embodiments of the disclosure are not limited to a single element or multiple elements thereof. Further, multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. A method performed by a device for controlling a flow rule in a software defined network (SDN), the method comprising:
 receiving a physical address request packet to enable a source host to communicate with a target host from a source network device connected to the source host;
 transmitting the received physical address request packet to a host connected to each of a plurality of network devices, wherein the physical address request packet is used to match an internet protocol (IP) address included in the physical address request packet with an IP address in each host;
 receiving, from the target host, a reply packet, wherein the target host corresponds to a host whose an IP address matches with the IP address included in the physical address request packet;
 identifying a first media access control (MAC) address associated with a source host and a second MAC address associated with a target host, based on the reply packet; and
 transmitting, to the source network device and a target network device connected the target host, a flow rule relating to a transmission path of a data packet transmitted from the source host to the target host,
 wherein the flow rule is determined based on the first MAC address and the second MAC address.

2. The method of claim 1, wherein the physical address request packet comprises an address resolution protocol (ARP) request packet of an IP version 4 (IPv4) network, and a physical address response packet comprises an ARP response packet of the IP version 4 (IPv4) network.

3. The method of claim 1, wherein the physical address request packet comprises a neighbor solicit (NS) packet of an IP version 6 (IPv6) network, and a physical address response packet comprises a neighbor advertisement (NA) packet of the IP version 6 (IPv6) network.

4. The method of claim 1, further comprising transmitting a physical address response packet to the source network device so as to allow the source host to acquire a physical address of the target host.

5. A device for controlling a flow rule in a software defined network (SDN), the device comprising:
 a transceiver configured to be able to communicate with a source network device connected to a source host and a target network device connected to a target host; and
 at least one processor connected to the transceiver,
 wherein the at least one processor comprises a processor configured to:
  control the transceiver to receive a physical address request packet to enable the source host to communicate with the target host from the source network device;
  control the transceiver to transmit the physical address request packet to a host connected to each of a plurality of network devices, wherein the physical address request packet is used to match an internet protocol (IP) address included in the physical address request packet with an IP address in each host;
  control the transceiver to receive, from the target host, a reply packet, wherein the target host corresponds to a host whose an IP address matches with the IP address included in the physical address request packet;
  identify a first media access control (MAC) address associated with a source host and a second MAC address associated with a target host, based on the reply packet; and
  control the transceiver to transmit, to the source network device and the target network device, a flow rule relating to a transmission path of a data packet transmitted from the source host to the target host, and
 wherein the flow rule is determined based on the first MAC address and the second MAC address.

6. The device of claim 5, wherein the physical address request packet comprises an address resolution protocol (ARP) request packet of an IP version 4 (IPv4) network, and a physical address response packet comprises an ARP response packet of the IP version 4 (IPv4) network.

7. The device of claim 5, wherein the physical address request packet comprises a neighbor solicit (NS) packet of an IP version 6 (IPv6) network, and a physical address response packet comprises a neighbor advertisement (NA) packet of the IP version 6 (IPv6) network.

8. The device of claim 5, wherein a physical address comprises a media access control (MAC) address.

9. The device of claim 5, wherein a physical address response packet comprises a physical address of the source host and a physical address of the target host.

10. The device of claim 5, wherein the data packet comprises a data packet, a source MAC address of which is identical to a physical address of the source host, and a destination MAC address of which is identical to a physical address of the target host.

11. The device of claim 5, wherein the at least one processor controls the transceiver such that a physical address response packet is transmitted to the source network device, so as to allow the source host to acquire a physical address of the target host.

12. The device of claim 5, wherein each of the source network device and the target network device comprises an SDN switch or an SDN router.

13. The method of claim 1, wherein a physical address comprises a media access control (MAC) address.

14. The method of claim 1, wherein a physical address response packet comprises a physical address of the source host and a physical address of the target host.

15. The method of claim 1, wherein the data packet comprises a data packet, the first MAC address of which is identical to a physical address of the source host, and the second MAC address of which is identical to a physical address of the target host.

16. The method of claim 1, wherein each of the source network device and the target network device comprises an SDN switch or an SDN router.

\* \* \* \* \*